United States Patent [19]
Hohmann et al.

[11] 4,153,608
[45] May 8, 1979

[54] ANTHRAQUINONE VAT DYESTUFFS

[75] Inventors: Walter Hohmann, Leverkusen; Detlef-Ingo Schütze, Bergisch-Gladbach, both of Fed. Rep. of Germany

[73] Assignee: Bayer Aktiengesellschaft, Leverkusen, Fed. Rep. of Germany

[21] Appl. No.: 851,308

[22] Filed: Nov. 14, 1977

[30] Foreign Application Priority Data
Nov. 25, 1976 [DE] Fed. Rep. of Germany ....... 2653644

[51] Int. Cl.² ............................................... C09B 5/26
[52] U.S. Cl. ............................................ 260/316; 8/34
[58] Field of Search .......................................... 260/316

[56] References Cited
U.S. PATENT DOCUMENTS

| 1,690,236 | 11/1928 | Mieg | 260/316 |
| 2,152,186 | 3/1939 | Graham | 260/316 |

Primary Examiner—Natalie Trousof
Assistant Examiner—R. W. Ramsuer
Attorney, Agent, or Firm—Plumley and Tyner

[57] ABSTRACT

Anthraquinone dyestuffs of the general formula

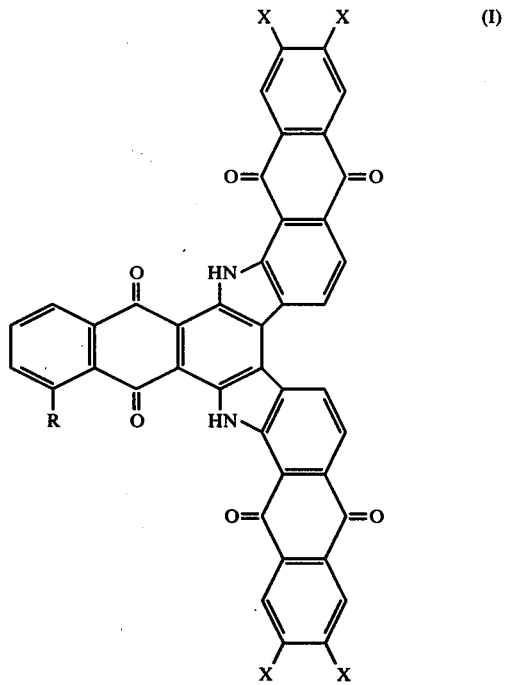

wherein
in each of the two anthraquinone radicals substituted by X, one X denotes chlorine and the other denotes hydrogen and
R represents hydrogen or an optionally substituted benzoylamino group,
and mixtures of the dyestuffs, in which the constituents of the mixture are 6-chloroanthraquinone and 7-chloroanthraquinone derivatives are suitable as a vat dyestuff for the dyeing of cotton in strong brown color shades with excellent fastness to light and vat processing.

2 Claims, No Drawings

ANTHRAQUINONE VAT DYESTUFFS

The invention relates to anthraquinone vat dyestuffs of the formula

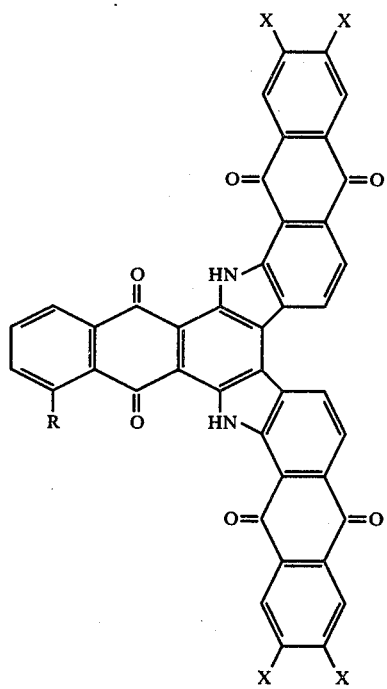

wherein in each of the two anthraquinone radicals substituted by X, and X denotes chlorine and the other denotes hydrogen and R represents hydrogen or an optionally substituted benzoylamino group, and mixtures of the dyestuffs, in which the constituents of the mixture are 6-chloroanthraquinone and 7-chloroanthraquinone derivatives.

The dyestuffs (I) are prepared in a manner which is in itself known by reacting 1,6-dichloro- or 1,7-dichloroanthraquinone or the mixture of the two dichloroanthraquinones with 1,4-diaminoanthraquinones of the formula

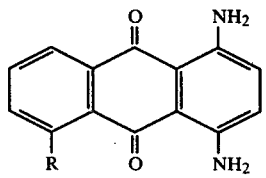

wherein

R has the meaning indicated, or by reacting 1-amino-6-chloro- or 1-amino-7-chloro-anthraquinone or the mixture of the two chloroanthraquinones with 1,4-dichloroanthraquinones of the formula

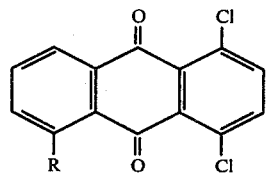

wherein

R has the meaning indicated, and subsequently carbazolising the product.

The benzoylamino group R can be monosubstituted to pentasubstituted, for example by $C_1-C_4$-alkyl, $C_1-C_4$-alkoxy or halogen, especially chlorine or bromine. Preferred substituents are methyl, chlorine and methoxy.

The carbazolisation is carried out, for example, by reacting the compound of the formula

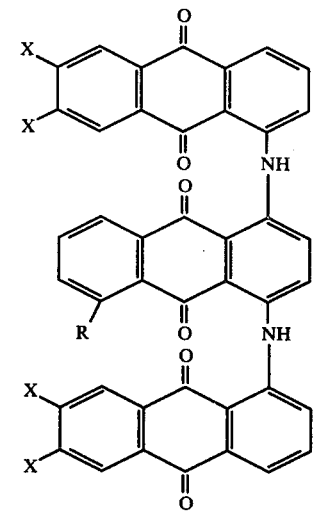

wherein

X and R have the meaning indicated, with 4-8 times the molar amount of anhydrous aluminium chloride in pyridine and subsequently oxidising the product, for example with hypochlorite, nitrite, dichromate or persulphate.

The dyestuffs dye cotton in the customary manner for vat dyestuffs in strong brown colour shades with excellent fastness to light and wet processing.

EXAMPLE 1

(a) 29.6 g of 1,4-diaminoanthraquinone, 69 g of a mixture of 1,6- and 1,7-dichloroanthraquinone (55:45) and 18.6 g of ground sodium carbonate are introduced into 320 ml of nitrobenzene, the mixture is heated to 150° C., whilst stirring, and 1 g of copper powder is added at this temperature. The mixture is then warmed to 205°–210° C. and stirred for 4 hours. The nitrobenzene is distilled off in vacuo and 110 g of a salt-containing product are obtained.

(b) 132 g of granulated aluminium chloride are dissolved in 550 ml of pyridine below 115° C. and 110 g of the finely ground product obtained according to paragraph (a) are added. The mixture is warmed to 135° C. and this temperature is maintained for one hour, whilst stirring. During this procedure, the colour shade changes from grey-black to brown.

The warm, liquid melt is stirred into 2.7 of 8% strength sodium hydroxide solution, the pyridine is expelled with steam and suspension which remains is after-treated with 350 ml of hypochlorite solution for one hour at 60°–70° C. After filtering off the precipitate, washing with hot water until neutral and drying, 107 g of a dyestuff are obtained which corresponds to the formula (I) (R=H).

EXAMPLE 2

(a) 32.5 g of a mixture of 1-amino-6-chloro- and 1-amino-7-chloro-anthraquinone (55;45), 25 g of 1-benzoylamino-5,8-dichloroanthraquinone and 16 g of ground sodium carbonate are introduced into 260 ml of nitrobenzene. The mixture is warmed to 120° C. in the course of 2 hours, 0.5 g of copper powder is added and the mixture is heated to 205° C. in the course of 3 hours. It is then stirred for 25 hours at this temperature, during which twice 0.5 g of copper powder are added. The precipitate is filtered off at room temperature, washed with methanol and dried. 48 g of product are obtained.

(b) 43 g of granulated aluminium chloride are dissolved in 120 ml of pyridine at 70° C. The solution is then heated to 100° C. and 48 g of the product obtained according to Example (a) are slowly introduced. The mixture is warmed to 125°–130° C., stirred for 1 hour 1.3 this temperature and then added to 1.3 l of water. 115 g of NaOH and 96 g of hypochlorite solution are added, the mixture is heated to the boil for one hour and the precipitate is filtered off, washed with water until neutral and dried.

42 g of a dyestuff of the formula (I) (R = benzoylamino) are obtained. Similar dyestuffs are obtained if 1-amino-6-chloro-/1-amino-7-chloro-anthraquinone mixtures in other mixture ratios or pure 1-amino-6-chloro-anthraquinone or pure 1-amino-7-chloro-anthraquinone are employed.

EXAMPLE 3

0.2 g of the dyestuff obtained according to Example 1, 0.4 g of sodium dithionite and 1.4 ml of NaOH (38° Be) are added to 160 ml of water at 50°–55° C., whilst stirring. After 15 minutes, 40 ml of a 10% strength sodium sulphate solution are added, 10 g of cotton yarn are put into the vat and dyeing is carried out for one hour at 50° to 55° C., whilst continuously moving the yarn.

The yarn is then squeezed off, oxidised for 10 to 15 minutes in the air, rinsed, treated with a 0.2% strength aqueous acetic acid solution in the cold for 5 minutes, rinsed again, soaped at the boil for 20 minutes, rinsed again and dried to 80° C.

A uniform brown dyeing of outstanding fastness to light and washing is obtained.

An outstandingly fast brown dyeing of the cotton yarn is obtained, by the abovementioned dyeing process, with 0.2 g of the dyestuff obtained according to Example 2.

We claim:

1. Anthraquinone vat dyestuff of the formula

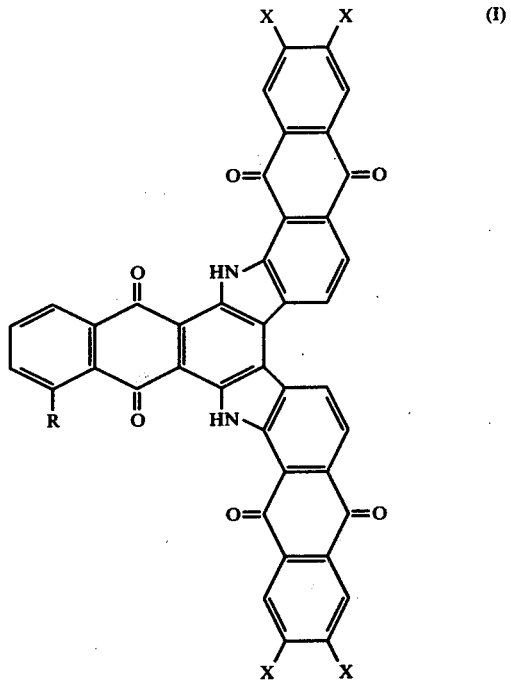

wherein
in each of the two anthraquinone radicals substituted by X, one X is chlorine and the other is hydrogen; and
R is hydrogen; benzoylamino, or benzoylamino substituted by $C_1$–$C_4$-alkyl, $C_1$–$C_4$ alkoxy or halogen.

2. Anthraquinone dyestuff of claim 1, wherein R is benzoylamino, methylbenzoylamino, methoxybenzoylamino, chlorobenzoylamino or hydrogen.

* * * * *